Figure 1:
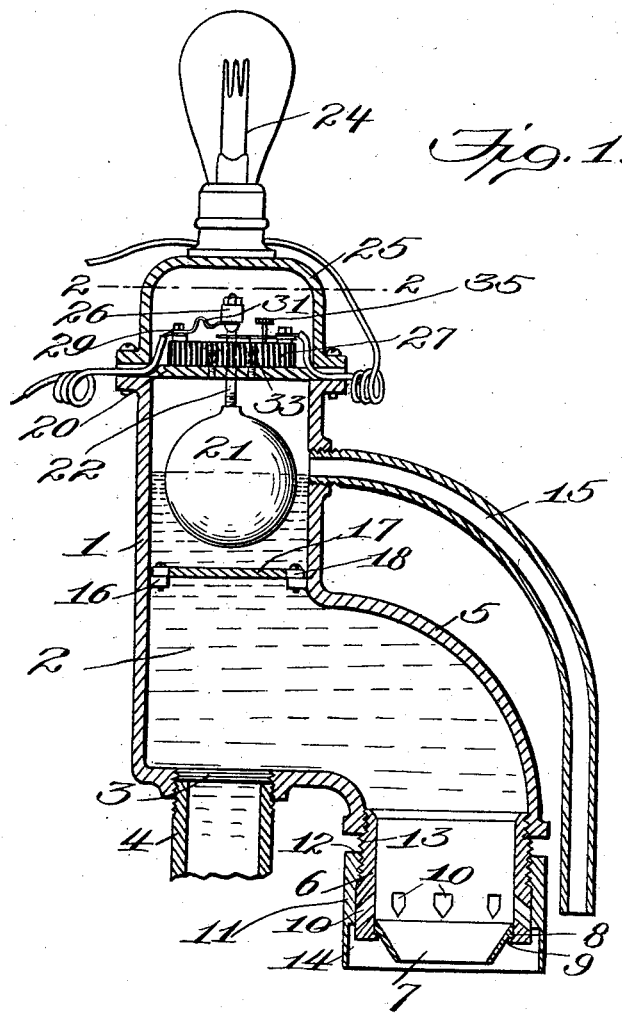

J. FOLEY.
LIQUID INDICATOR AND LEAK DETECTOR.
APPLICATION FILED NOV. 4, 1908.

930,171.

Patented Aug. 3, 1909.

2 SHEETS—SHEET 1.

Witnesses:

Inventor
Jeremiah Foley
By Jesse E. Potbury
Atty.

J. FOLEY.
LIQUID INDICATOR AND LEAK DETECTOR.
APPLICATION FILED NOV. 4, 1908.
930,171.
Patented Aug. 3, 1909.
2 SHEETS—SHEET 2.
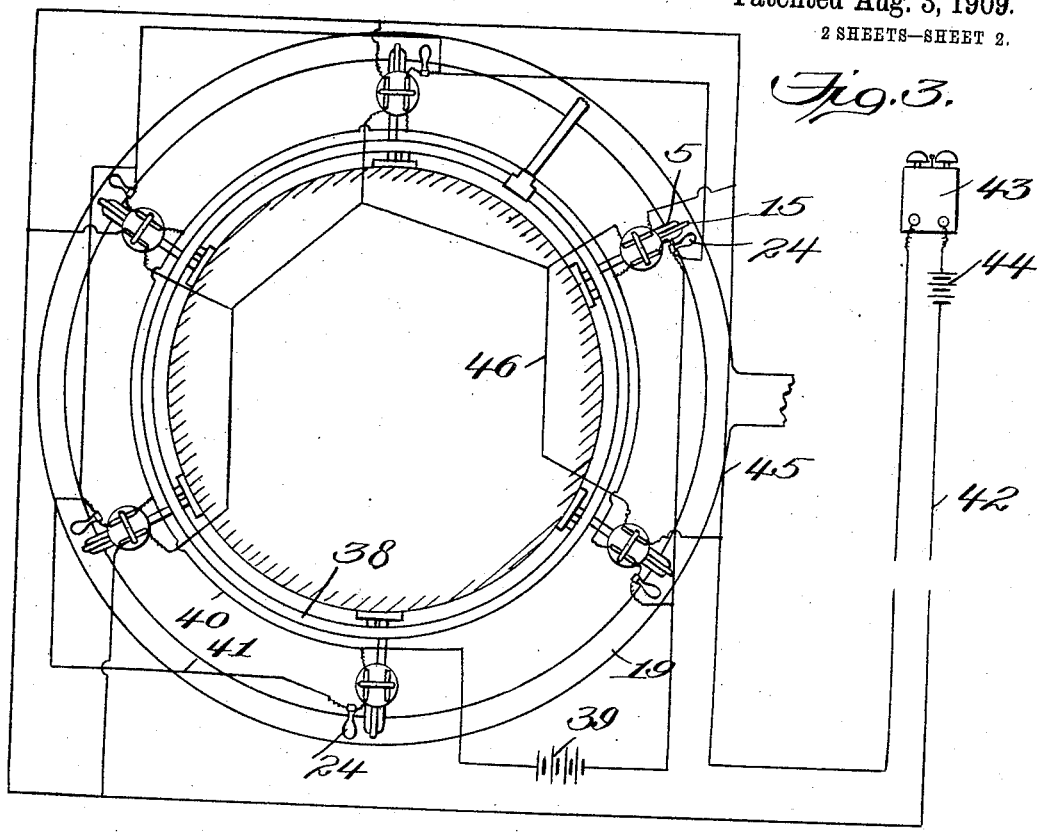
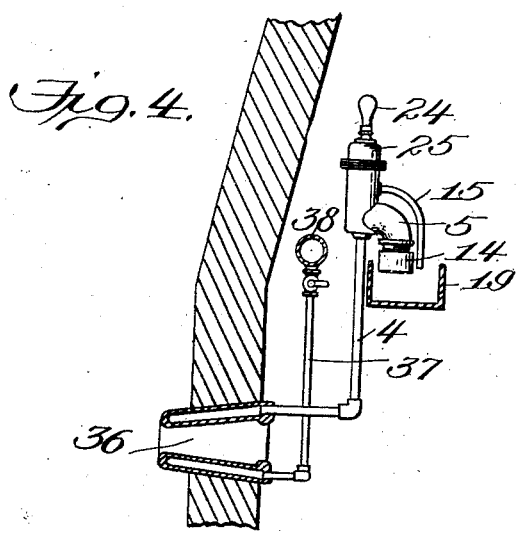
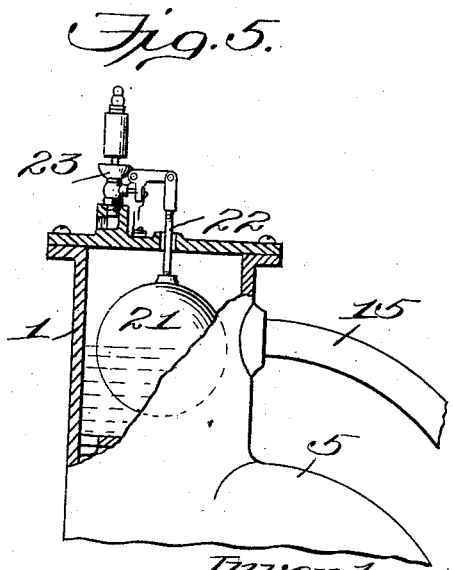
Witnesses:
Inventor
Jeremiah Foley
By Jesse E. Potbury
Atty.

UNITED STATES PATENT OFFICE.

JEREMIAH FOLEY, OF BIRMINGHAM, ALABAMA, ASSIGNOR OF ONE-THIRD TO DANIEL F. GIBSON AND ONE-THIRD TO OSCAR T. WHITE, BOTH OF BIRMINGHAM, ALABAMA.

LIQUID-INDICATOR AND LEAK-DETECTOR.

No. 930,171.   Specification of Letters Patent.   Patented Aug. 3, 1909.

Application filed November 4, 1908.   Serial No. 461,010.

*To all whom it may concern:*

Be it known that I, JEREMIAH FOLEY, a citizen of the United States, residing at Birmingham, in the county of Jefferson and State of Alabama, have invented certain new and useful Improvements in Liquid-Indicators and Leak-Detectors, of which the following is a specification.

My present invention relates to improvements in devices for indicating the stoppage, diminution, or other variation in the flow of water or other liquids, and it has for its object primarily to provide a simple and improved device of this character which is especially adapted for use in connection with the water-circulating or cooling systems for twyers or bosh blocks of blast furnaces for giving an alarm or signal should the volume of water circulating through the twyers or bosh blocks diminish owing to a fracture or burning out of such parts or a stoppage in the circulating pipes, although the invention may be used with facility in various connections wherein it is desirable to determine whether a flow of water or other liquid is normal or constant.

Another object of the invention is to provide means whereby the detector may be set conveniently so that it shall operate to give an alarm or other signal the moment the volume of water or liquid falls below a predetermined point or, in other words, it may be adjusted so that it shall operate after a leakage of a certain extent has occurred.

A further object of the invention is to provide an alarm circuit to be connected to a plurality of detectors with which a furnace is equipped and also to provide a local signal for indicating the particular point where the leakage, stoppage or other abnormal condition exists whereby an abnormal condition arising in one furnace will give an appropriate signal or alarm at a distant or central point which enables a supervisor to locate the particular furnace which needs attention, and the local signal will indicate the precise point where the defect or abnormal condition exists so that the defect or abnormal condition may be remedied promptly and without interrupting the operation of the furnace or impairing the value of its product under treatment.

To these and other ends, the invention consists in certain improvements, and combinations and arrangements of parts, all as will be hereinafter more fully described, the novel features being pointed out particularly in the claims at the end of the specification.

Figure 2:
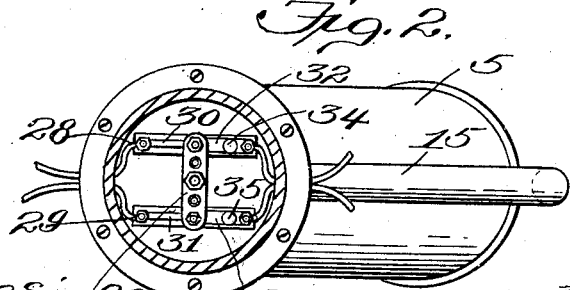

In the accompanying drawing:—Figure 1 represents a vertical sectional view of an indicator or like detector constructed in accordance with my present invention; Fig. 2 represents a sectional view taken upon the line 2—2 of Fig. 1; Fig. 3 is a diagrammatic view illustrating a manner of connecting a plurality of the detectors upon a furnace to a local circuit and to a distant signal circuit; Fig. 4 is a diagrammatic view showing a portion of the furnace wall having a twyer mounted therein, and the twyer is equipped with a detector constructed in accordance with the present invention; and Fig. 5 shows a different form of the detector wherein a whistle is provided as a local signal.

Similar parts are designated by the same reference characters in the several views.

My present invention is intended primarily for use upon blast furnaces and other apparatus wherein a constantly-flowing body of water or other liquid serves to cool parts which would become overheated or burned should the volume of water diminish or become interrupted, and it may be used to particular advantage in connection with blast furnaces wherein the twyers must be cooled by a body of water of uniform volume circulating therethrough.

In operating blast furnaces, practice has demonstrated that the twyers are either fractured or are burned out at their inner ends, causing a leakage of the circulating water into the furnace which impairs the value of the product under treatment and also diminishes the volume of water circulating through the twyer to such an extent as to permit the twyer to overheat and burn out. The present invention provides means for instantly indicating whether a leak has occurred in the twyers and also designating which particular twyer of the great number used upon the furnace is defective. It also provides means for indicating whether a stoppage in the pipes or valves of the circulating system has occurred, such stoppages occurring owing to the fact that the water used in circulating systems for furnaces is usually drawn from streams, and leaves and other material enter the circulating systems and cause stoppage of the water.

In the accompanying drawing, I have shown one specific embodiment of the invention which is especially adapted for use in the connection just described. It will be understood, of course, that certain changes may be made in the construction and arrangement of its parts in order that the invention may be applied to the best advantage in each particular case.

In the present instance, the device comprises a housing 1 having a water chamber 2, an inlet 3 being provided preferably in the bottom of the housing to which the discharge pipe 4 of a cooling or water-circulating system may be connected and an elbow or branch 5 preferably leads laterally from the body of the housing and serves as a discharge therefor. During the normal operation of the device, a sufficient volume of water or liquid will be contained in the housing to maintain the water level at a predetermined point. In order to set the device so as to normally maintain the level of the water or liquid at a predetermined point, a regulating or throttling valve of a suitable construction is provided for the discharge opening in the housing. While any suitable throttling or regulating valve may be employed for this purpose, I preferably employ one such as that shown in the present instance, it consisting of a tubular body 6 which may be threaded or otherwise fitted into the discharge end of the portion 5 and a nozzle 7 is mounted in this tubular body so as to permit the escape of water therethrough. This nozzle is preferably removable so that nozzles of different sizes may be readily interchanged according to the capacity of the circulating system to which the device is applied, the nozzle in the present instance having substantially the form of a truncated cone and being provided with a peripheral flange 8 which rests upon and coöperates with an interior shoulder 9 formed at the lower end of the body 6. By removing the latter, the nozzle may be detached and, if so desired, it may be replaced by others of different sizes. The nozzle is capable of discharging the major portion of the water from the housing and is usually of a size sufficient to prevent clogging thereof. In order to vary the amount of water discharging from the housing and thereby adjust the water level therein, the tubular body is provided with a suitable number of by-passages or ports 10, those shown in the present instance being inclined downwardly and outwardly and their inner ends communicating with the interior of the body 6 at a point above the nozzle. The exterior of the body 6 is of a regularly rounded or cylindrical form, and an adjusting sleeve 11 is fitted over the body 6 and is adjustable axially thereof in order to vary the openings of the by-passages. In the present instance, the adjusting sleeve has a portion 12 which coöperates with a correspondingly threaded portion 13 of the body 6, the said threaded portion serving also in the present instance to attach the body 6 to the housing. By turning the adjusting sleeve, the latter will be moved axially of the body 6 and will thus cause the internal annular recess 14 therein to communicate more or less with the by-passages, thereby permitting a certain amount of the water to discharge from the throttling valve in addition to that which discharges through the nozzle.

An overflow pipe 15 communicates with the upper portion of the housing at or in proximity to the normal water level therein, this pipe being preferably arranged above the lateral branch or elbow 5 of the housing and being also bent or curved downwardly so as to discharge in the same trough or receptacle 19 which receives the water from the throttling or regulating valve. In order to deflect the water entering the housing so as to prevent the water level from being unduly disturbed owing to the force of the water entering the housing, a suitable baffle is provided between the normal water level and the inlet. In the present instance lugs 16 are formed in the interior of the housing above the inlet, and a plate 17 is secured to these lugs by screws or other suitable means, recesses or passages 18 being formed in the plate in order that communication may be established between the upper and lower sides. The top of the housing may be closed by a plate or cover 20.

The overflow pipe 15 serves as a local signal whereby a diminution in the volume of water passing through the housing may be detected, and in many instances, it may be sufficient to provide this overflow pipe only which will serve as an alarm or signaling device. In those cases, the throttling valve is so adjusted as to maintain the water level in the housing at or slightly above the overflow pipe, a small quantity of water discharging from the latter and thereby indicating under normal conditions that no leakage or stoppage exists in the circulating system. The amount of the leakage to be detected may correspond to the amount of water which overflows through the pipe 15 when the apparatus is operating properly, and this adjustment may be effected by properly setting the throttling valve. Should the discharge of water from the pipe 15 cease, it will indicate that the particular apparatus to which this detector is connected requires attention either due to a stoppage in the circulating system because of clogging of the pipes, or a leakage in the twyer or other part to be cooled. It is preferable, however, to provide means for giving an appropriate alarm when the water level in the housing falls below a given point, and in the present instance, I provide a part which is operable according to variations in the level of the liquid in the housing. While different devices may be employed for this purpose, I provide a float 21 in the present instance which is arranged above the baffle plate 17 and has sufficient buoyancy to float it. The float is provided with a stem 22 which extends loosely through an opening in the top plate or cover 20, and should it be desirable to sound an audible alarm, a whistle 23 may be mounted upon the top plate and so connected to the stem of the float as to cause the whistle to be sounded when the float falls below a predetermined point. The whistle could be connected to any suitable source of fluid-pressure supply, such as air or steam, and such construction is shown in Fig. 5 of the drawing. In other instances, it may be preferable to employ a visual alarm and, in Figs. 1 to 4, inclusive, I have shown an electric lamp 24 which may be mounted upon a cap 25 which is superposed on the housing. In this construction, the upper end of the float stem carries a cross-head 26 which is arranged above an insulating block 27, the latter being mounted upon the top of the plate 20. The block is provided with a pair of terminals 28 and 29 which are connected by the flexible conductors 30 and 31 to contacts upon the under side of the cross-head, and these contacts are so arranged that they shall engage coöperating contacts 32 and 33, the latter being preferably adjustable by means of the screws 34 and 35 or otherwise so that circuits will be completed between the terminals 28 and 32 and 29 and 33 when the float falls below a predetermined point. The lamp is connected in circuit with the contacts 20 and 33 so that when the float falls below a given point the lamp which is also connected to a suitable source of current supply will be lighted, thus indicating by a visual signal that the circulating system to which this particular detector is attached requires attention. It is also preferable to provide means for giving a distant alarm should any of the detectors upon one or more furnaces operate due to a failure or diminution in the water flowing therethrough, and such distant signal or alarm is adapted to be closed between the contacts 28 and 32.

In equipping a furnace with a set of detectors constructed in accordance with the present invention, each twyer 36 is provided with an inlet pipe 37 which leads from a general supply pipe 38, and the inlet pipe 4 of the housing is connected to receive water flowing from the twyer as illustrated in Fig. 4. A local circuit is provided having a source of current supply 39 and this local circuit comprises two conductors 40 and 41 across which the lamp or local signal for each detector is bridged by being connected to the contacts 29 and 33 thereof, so that should the float in any of the detectors fall below a given point, the respective lamp will be lighted. A distant signal circuit 42 is also provided which may lead to any desired point, it having a bell or other appropriate alarm or signal 43 connected therein and being also provided with a suitable source of current supply 44. This distant signal circuit also comprises two conductors 45 and 46, these latter conductors being connected to the contacts 28 and 32 so that should the float in any one of the detectors fall beyond a predetermined point it will cause a closing of the distant signal circuit through this particular detector and will thereby operate the alarm or signal. Under normal conditions, the floats of all of the detectors will be in elevated position owing to the fact that the proper volume of water is being supplied to each twyer. Should the flow of water, however, become diminished for any reason, it will cause a fall of the corresponding float and the falling movement of such float will cause the cross-head thereon to descend and thereby establish communication between the contacts 28 and 32 which are connected in the distant signal circuit 42, the alarm or signal 43 being thereby sounded indicating that a leakage or stoppage in the water supply of a particular furnace has occurred. The float will also cause a circuit to be established between the contacts 29 and 33 and, as these contacts are connected in the local circuit, the lamp only upon that particular detector which is connected to the defective twyer will be lighted, indicating to an inspector the exact location of the defect. The absence of an overflow from the pipe 15 will also indicate that a stoppage or leakage has occurred in the bottom circulating system or twyer to which it is connected.

It will, of course, be understood that certain of the indicating means may be omitted as it may not be necessary in every case to use them all.

The present invention provides a device of this character that is simple and of inexpensive construction and, in practice, is capable of operating with certainty or as an unfailing indicator of a leakage, stoppage or other abnormal condition existing in the water or cooling system to which it is connected. It may be used to especial advantage in connection with blast furnaces as it instantly notifies the attendants of the leakage or stoppage in any of the twyers, and it is possible to remedy the defect without impairing the value of the product under treatment in the furnace.

I contemplate employing the invention in various other connections wherein it is desirable to determine the uniformity of flow of water and other liquids, the invention not being limited necessarily to the cooling apparatus of furnaces and similar apparatus.

I claim as my invention:—

1. A device of the class described comprising a housing having a liquid chamber in its lower portion and an inlet and an outlet connected directly thereto and through which a volume of liquid may constantly flow, a throttling valve at said outlet for retarding to different degrees the flow of liquid through the housing, and an overflow pipe leading from the housing at substantially the normal liquid level therein and serving as means for visually indicating a variation in the volume of liquid flowing through the housing.

2. A device of the class described comprising a housing having an inlet and an outlet through which a volume of liquid may constantly flow, means at said outlet for retarding to different degrees such liquid flowing through the housing, and indicating means operable owing to a diminution of the volume of liquid flowing through the housing.

3. A device of the class described comprising a housing having an inlet and an outlet for conducting a volume of liquid through the housing, means at said outlet for obstructing to different degrees the flow of the liquid from the housing, and indicating means operable owing to a variation in the volume of liquid entering the housing.

4. A device of the class described comprising a housing having an inlet and an outlet through which a volume of water may constantly flow, a throttling valve at said outlet for regulating the volume of liquid discharging from the housing, and indicating means operable owing to a variation of the volume of liquid flowing through the housing.

5. A device of the class described comprising a supply pipe, a part to be cooled connected to receive liquid from said pipe, a discharge pipe leading from said part, a housing connected to receive liquid from the discharge pipe, a throttling valve through which the liquid discharges after passing through the housing for regulating the volume of water discharging from the housing, and indicating means operable owing to a variation in the volume of liquid flowing through the housing.

6. A device of the class described comprising a housing having an inlet and an outlet for receiving and discharging a constantly flowing body of liquid, a throttling valve for controlling the volume of liquid discharging from the outlet, said valve having a nozzle of a fixed size and by-passages, and a part for controlling said passages, and indicating means operable automatically owing to a variation in the volume of liquid flowing through the housing.

7. A device for determining variations in the flow of liquid comprising a housing having an inlet adapted to be connected to a part containing a flowing liquid and an outlet through which a volume of liquid may flow constantly and having means for varying its size so as to maintain the liquid level normally at a given point, and an overflow pipe leading from the housing substantially at the normal liquid level.

8. A device of the class described comprising a housing having a liquid chamber and an inlet and an outlet connected directly thereto and through which a volume of liquid may constantly flow, means at said outlet for retarding to different degrees the discharge of the liquid from the housing, a part arranged to be actuated by variations in the amount of liquid flowing through the housing, and a signal device operatively connected to said part.

9. A device of the class described comprising a housing having in its lower portion a liquid chamber and an inlet and an outlet both connected directly to the lower portion of the housing through which a volume of liquid may constantly flow, means at said outlet for retarding to different degrees the flow of liquid through the housing, a part operable by fluctuations in the amount of liquid flowing through the housing, an electric signal, and a switch operatively connected to said part for automatically closing a circuit through said signal.

10. A device for detecting variations or interruptions in the flow of liquids comprising a housing having an inlet and an outlet through which the liquid may flow constantly, the portion of the housing connecting the inlet and outlet being substantially unobstructed, a device at said outlet adjustable so as to obstruct to different degrees the flow of the liquid after entering the housing so as to produce a back pressure upon the liquid contained therein, and indicating means operable owing to a variation in the volume of liquid flowing into the housing.

11. A device of the class described comprising a housing having an inlet and an outlet through which a volume of liquid may flow, a throttling valve at said outlet, indicating means operable owing to a diminution in the volume of liquid flowing through the housing, and a signaling device operable automatically owing to a variation in the height of the liquid in the housing.

In testimony whereof I have hereunto set my hand in presence of two subscribing witnesses.

JEREMIAH FOLEY.

Witnesses:
   LUCIA EDWARDS,
   CHARLES A. CALHOUN.